United States Patent
Fujioka

[11] 3,856,386
[45] Dec. 24, 1974

[54] EXTRAWIDE-ANGLE RETROFOCUS TYPE OF OBJECTIVE

[75] Inventor: Yoshisato Fujioka, Tokyo, Japan

[73] Assignee: Kabushiki Kaisha Yashica, Tokyo-to, Japan

[22] Filed: May 8, 1973

[21] Appl. No.: 358,266

[30] Foreign Application Priority Data
May 9, 1972  Japan............................... 47-45044

[52] U.S. Cl. ............................................... 350/214
[51] Int. Cl. ................................................ G02b 9/64
[58] Field of Search..................... 350/214, 176, 177

[56] References Cited
UNITED STATES PATENTS
3,549,241  12/1970  Mori ............................. 350/214 X
3,728,011  4/1973  Mori ................................. 350/214
3,748,021  7/1973  Tajima et al........................ 350/214

Primary Examiner—John K. Corbin
Attorney, Agent, or Firm—Steinberg & Blake

[57] ABSTRACT

An extrawide-angle objective of retrofocus type. The objective has a back focal length which is longer than 1.85 times the focal length of the entire objective. At the same time, the aperture ratio is on the order of 1:3.3, and the effective photographing angle is as wide as 94.5°. While having these latter features, the objective at the same time is of a relatively small size and does not encounter any deterioration in its performance. The objective preferably is intended as an interchangeable objective for a single lens reflex camera.

9 Claims, 26 Drawing Figures

FIG. 1
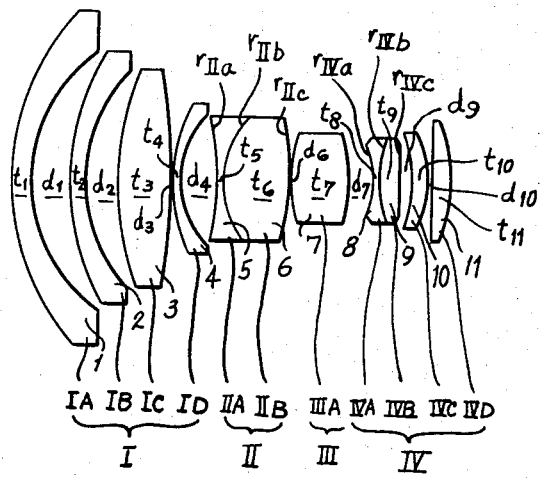
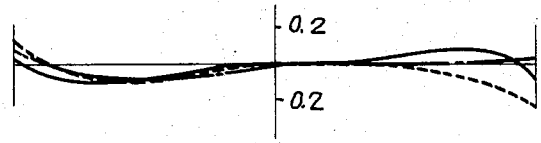
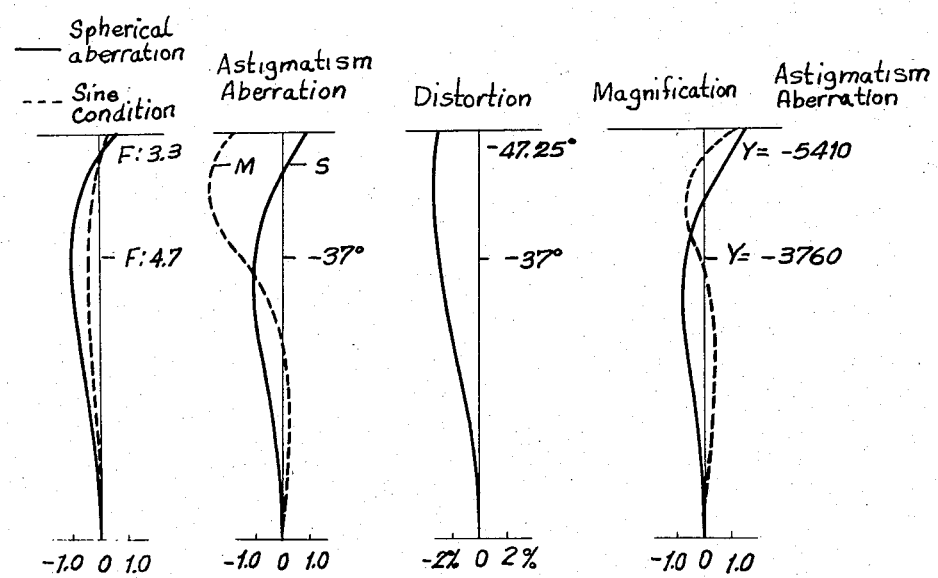
FIG. 1A   FIG. 1B   FIG. 1C   FIG. 1D   FIG. 1E FIG. 2
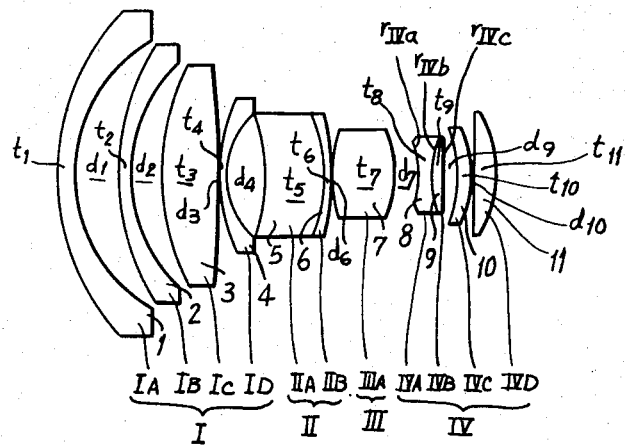
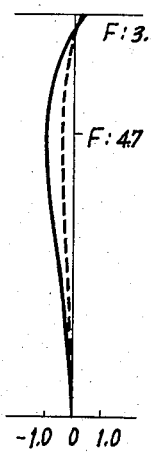
FIG. 2A
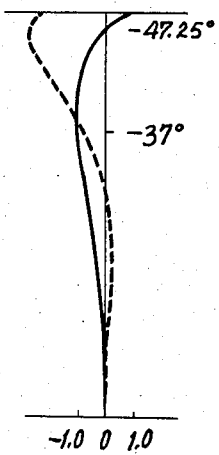
FIG. 2B
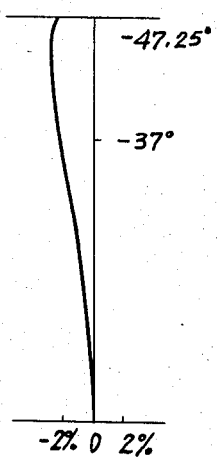
FIG. 2C FIG. 3
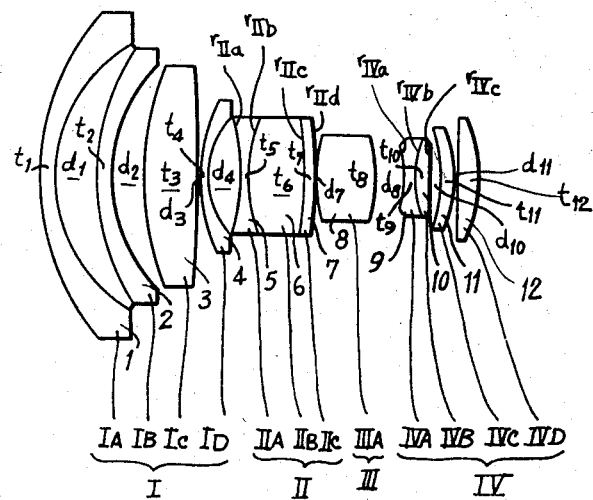
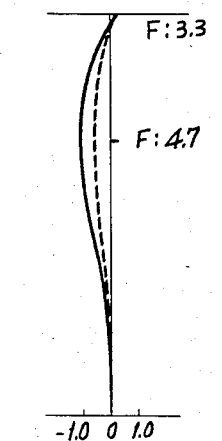
FIG. 3A
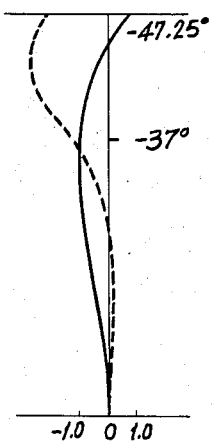
FIG. 3B
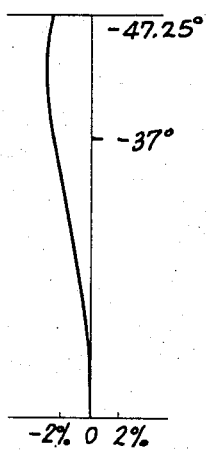
FIG. 3C

FIG. 4
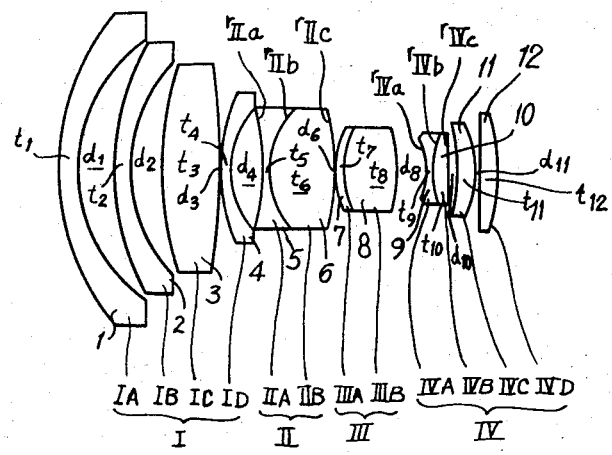
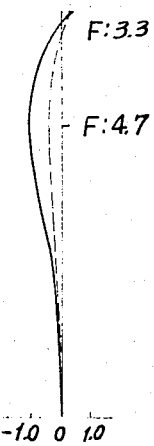
FIG.4A
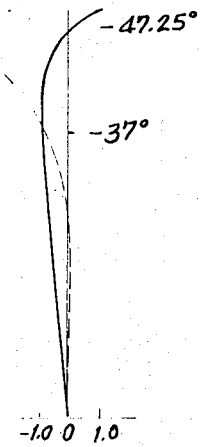
FIG.4B
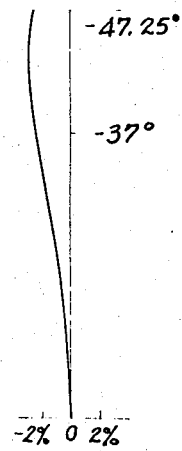
FIG.4C

FIG.5
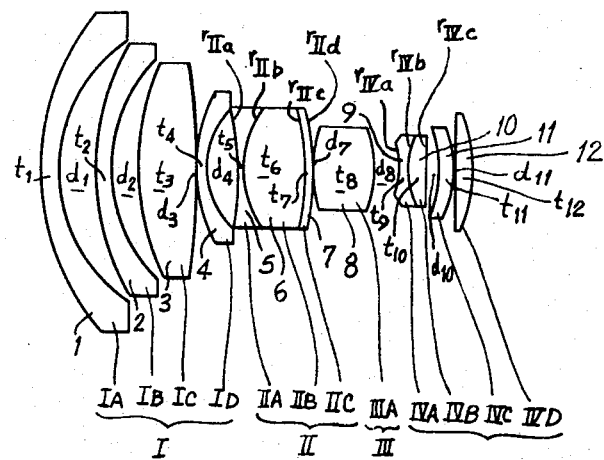
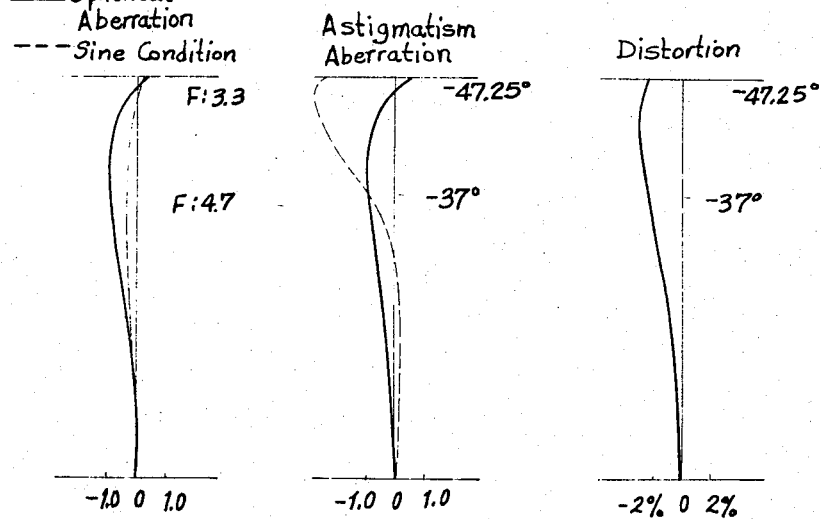
FIG.5A  FIG.5B  FIG.5C

FIG. 6
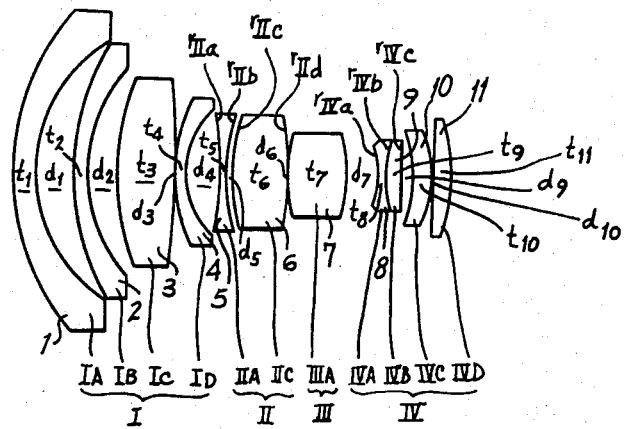
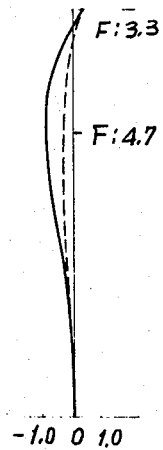
FIG. 6A
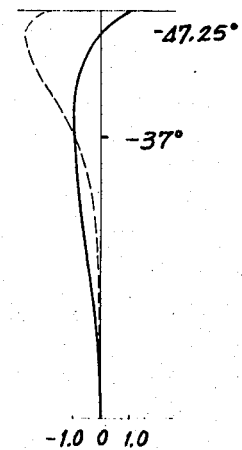
FIG. 6B
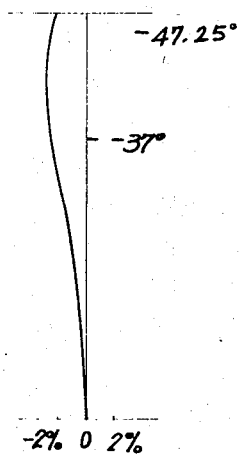
FIG. 6C

EXTRAWIDE-ANGLE RETROFOCUS TYPE OF OBJECTIVE

BACKGROUND OF THE INVENTION

The present invention relates to cameras.

In particular, the present invention relates to camera objectives, and especially to interchangeable objectives of the type which are adapted to be selectively used with a single lens reflex camera.

In particular, the objective of the present invention is an extrawide-angle objective of retrofocus type.

Experience has shown that objectives of this latter type encounter a negative distortion which increases as the photographing angle increases. Moreover, the negative distortion increases with an increase in the back focal length and in the aperture ratio, with the result that the aperture of the front lens tends to be undesirably enlarged. In addition, it becomes more and more difficult, when increasing the back focal length, the photographing angle, and the aperture ratio, to correct aberrations which are encountered. Thus, it has proved to be extremely difficult to design an objective which has a desirably long back focal length, a desirably large photographing angle, as well as a desirably large aperture ratio, while at the same time avoiding undesirable aberrations.

Furthermore, experience has shown that when constructing an objective of this type, it is difficult to maintain the entire objective relatively small and compact.

SUMMARY OF THE INVENTION

It is accordingly a primary object of the present invention to provide an extrawide-angle objective of retrofocus type which will avoid the above drawbacks.

In particular, it is an object of the present invention to provide an extrawide-angle retrofocus type of objective which is capable of having a relatively long back focal length, a relatively large aperture ratio, as well as an extremely wide photographing angle, while at the same time avoiding excessive aberrations and maintaining the size of the entire objective relatively small.

In accordance with the present invention, the extrawide-angle retrofocus type of objective has a relatively long back focus which is at least 1.85 times the focal length of the entire objective and a relatively high aperture ratio on the order of 1:3.3. The objective is made up of at least eleven lenses which are arranged in four groups or sections I–IV of which groups or sections I and IV each include four lenses, while section III includes at least one lens and group or section II includes at least two lenses which have a diverging effect. The first and second lenses of the first group have a combined focal length which is between 1.2 and 3 times the focal length of the entire objective. The radius of curvature of the first surface of the second group of lenses when divided into 1 is less than 0. The difference between the refractive indexes with respect to the $d$-line of the first and second lenses of the second group when divided by the radius of curvature of the rear surface of the first lens of the second group is between 0 and the focal length of the entire objective divided into 0.5. The distance along the principal axis between the first and second groups of lenses when added to the thickness of the first lens of the second group divided by the refractive index thereof and the thickness of the second lens of the second group divided by the refractive index thereof is between 0.3 and 0.7 times the focal length of the objective. The difference between the refractive indexes of the first two lenses of the fourth group when divided by the radius of the rear surface of the first lens of the fourth group is between 0 and 0.5 divided by the focal length of the entire objective.

It has been found that with the objective conforming to the above requirements, it is possible to avoid undesirable aberrations so that an exceedingly effective optical performance is achieved, while at the same time a photographing angle as wide as 94.5° is achieved.

BRIEF DESCRIPTION OF DRAWINGS

The invention is illustrated by way of example in the accompanying drawings which form part of this application and in which:

FIG. 1 is a schematic illustration of one embodiment of an objective according to the present invention;

FIGS. 1A–1E are respectively graphs illustrating characteristics of the objective of FIG. 1;

FIG. 2 is a schematic illustration of a second embodiment of an objective according to the invention;

FIGS. 2A–2C are respectively graphs illustrating characteristics of the objective of FIG. 2;

FIG. 3 is a schematic illustration of a third embodiment of an objective according to the invention;

FIGS. 3A–3C are respectively graphs illustrating characteristics of the embodiment of the invention illustrated in FIG. 3;

FIG. 4 is a schematic illustration of a fourth embodiment of an objective according to the invention;

FIGS. 4A–4C are respectively graphs illustrating characteristics of the embodiment of the invention which is illustrated in FIG. 4;

FIG. 5 is a schematic illustration of a fifth embodiment of an objective according to the invention;

FIGS. 5A–5C are respectively graphs illustrating characteristics of the embodiment of the invention which is illustrated in FIG. 5;

FIG. 6 is a schematic illustration of a sixth embodiment of an objective according to the invention; and FIGS. 6A–6C are respectively graphs illustrating characteristics of the embodiment of the invention which is illustrated in FIG. 6.

DESCRIPTION OF PREFERRED EMBODIMENTS

The superwide or extrawide-angle objective of the present invention has a relatively long back focal length and is intended to be used as an exchangeable objective for a single-lens reflex camera where a reflecting mirror is tiltably movable, in an upward direction when an exposure is made. With an objective of this type the negative distortion increases as the photographing angle, the back focal length and the aperture ratio increase, with the result that the aperture of the front lens tends to become enlarged and it becomes increasingly difficult to correct aberrations which are encountered.

However, these drawbacks are avoided with the objective of the present invention.

Referring to the drawings, it will be seen from FIGS. 1–6 that all six of the illustrated embodiments of the objective of the invention include four groups or sections of lenses I–IV.

Considering group I, it will be seen that in all of the embodiments this first group of lenses, which is the front group directed toward the object to be photographed, consists of three negative meniscus lenses $I_A$, $I_B$ and $I_D$, which respectively have their convex surfaces at the front directed toward the object to be photographed and their concave surfaces rearwardly directed toward the image side of the objective. The first and second lenses $I_A$ and $I_B$ are separated from the fourth lens $I_D$ by the third lens $I_C$ of this first group, this third lens $I_C$ being a positive lens. Thus, the first group of lenses $I_A$–$I_D$ provides a divergent effect.

The second group II of lenses of the objective is composed in the embodiments of FIGS. 1, 2, and 4 of two lenses which are cemented to each other, while in the embodiments of FIGS. 3 and 5, the second group of lenses is composed of three lenses which are cemented to each other. In the case of the embodiment of FIG. 6, however, the second group of lenses is composed of three lenses which include an air lens between the first and third lenses $II_A$ and $II_C$ of the second group II of lenses.

In the embodiment of FIG. 6 the air lens which is interposed between the first and third lenses of the second group has a negative refractive power. With the embodiments where the lenses of the second group are cemented to each other, the total refractive power of the cemented surfaces has a divergent effect, while in the embodiment of FIG. 6 where the air lens is used, the air lens has the configuration of a meniscus lens provided with a convex front surface directed toward the objective to be photographed.

The third group or section III of the lenses of the objective is composed in the embodiment of FIG. 4 of two lenses $III_A$ and $III_B$ which are positive and cemented to each other, and in all other embodiments of a single positive lens $III_A$.

The fourth group IV of lenses of the objectives of the invention is made up in all embodiments of four lenses of which the first two $IV_A$ and $IV_B$ are cemented to each other. This first lens $IV_A$ is in all embodiments a negative biconcave lens, while the lens $IV_B$ which is cemented thereto is a positive lens having a convex surface directed forwardly toward the object to be photographed. The third lens $IV_C$ of all of the embodiments is a positive meniscus lens having a convex surface directed rearwardly toward the image side of the objective, and this third lens of the fourth group is followed by the fourth lens $IV_D$ which in all embodiments is a positive lens. The cemented lenses $IV_A$ and $IV_B$ of the fourth group have a negative refractive power and their cemented surfaces have a divergent effect.

All of the illustrated and described embodiments of the invention conform to a number of requirements which enables all of the embodiments of the invention to achieve the outstanding results of the present invention.

In all of the embodiments of the invention the first and second lenses $I_A$ and $I_B$ of the first group I conform to:

Requirement 1: $1.2f < |f_{IA+IB}| < 3f$ where $f_{IA+IB}$ is the combined focal length of the first two lenses $I_A$ and $IB$, and $f$ is the focal length of the entire objective.

Although it is preferred that the negative refractive power of the system of combined front negative lenses $I_A$ and $I_B$ be intensified in order to enlarge the back focal length, an excessive intensification would rapidly increase negative distortion and coma aberration, and these faults would be difficult to correct. The requirement that the combined focal length of the first two lenses be greater than $1.2f$ provides a lower limit which enables the negative distortion and coma aberration caused by the system of the combined front negative lenses to be effectively corrected while the requirement that the combined focal length of the first two lenses be less than $3f$ provides an upper limit which enables an extremely long back focal length (at least $1.85f$ in all embodiments) to be maintained.

The second group II of lenses of all embodiments has an extremely low refractive power and the front or first surface of the second group conforms to:

Requirement 2: $1/r_{IIa} < 0$.

By meeting this latter requirement it becomes possible for oblique light rays which are incident upon the periphery of the lens at a large angle to be refracted in a direction along which the inclination thereof is reduced, and the larger the inclination of incidence, the higher the efficiency. As a result the lens aperture is prevented from increasing and possible aberration of a higher order is reduced. If $1/r_{IIa} \geq 0$, the efficiency is lowered, and the result is an increased lens aperture and aberration of a higher order. Thus, these drawbacks are avoided with requirement 2.

In the embodiments of FIGS. 1, 2, and 4 where the second group consists of a pair of cemented lenses, the cemented surfaces conform to:

Requirement 3: $0 < n_{IIA} - n_{IIB}/r_{IIb} < 0.5/f$, whereas in the case of the embodiments of FIGS. 3 and 5, where the second group consists of three lenses $II_A - II_C$ which are cemented to each other, this third requirement becomes:

Requirement 3: $0 < n_{IIA} - n_{IIB}/r_{IIb} + n_{IIB} - n_{IIC}/r_{IIc} < 0.5/f$.

When a back focal length at least as long as $1.85f$ and an aperture ratio as high as 1:3.3 is provided, intensification of the negative refractive power in the first group would increase negative distortion and coma aberration in a highly disadvantageous manner for achieving properly corrected aberration, as pointed out above. However, the requirement 3 set forth above for either two or three cemented lenses of the second group achieves a negative total refractive power of the cemented surfaces and it has been found from experience that this is an effective expedient for increasing the back focal length with only a slight influence on the various types of aberration, particularly on negative distortion. Furthermore, it is known from experience with lens design that the combination of glass materials having different Abbe numbers is capable of improving correction of chromatic aberration. The lower limit of requirement 3 according to which the totals of the fractions set forth in requirement 3 are greater than 0 sets forth the limit beyond which the total refractive power of the cemented surfaces cannot be maintained negative. On the other hand the upper limit according to which the total of the fractions of requirement 3 must be less than the focal length of the entire objective divided into 0.5 prevents increase of coma aberration and excessive correction of image field curvature.

Between the first group I and the second group II of the lenses of the objectives of all embodiments there is along the principal axis an air gap having a length $d_4$, and this latter air gap together with the thicknesses of the lenses of the second group conform to:

Requirement 4: $0.3f < d_4 + t_{IIA}/n_{IIA} + t_{IIB}/n_{IIB} < 0.7f$ in embodiments of FIGS. 1, 2, and 4, where there are only two lenses in the second group and:

Requirement 4: $0.3f < d_4 + t_{IIA}/n_{IIA} + t_{IIB}/n_{IIB} + t_{IIC}/n_{IIC} < 0.7f$ for the remaining embodiments where there are three lenses in the second group.

As a result of the above requirement 4, the optical length along the principal axis from the rearmost surface of the first group I to the rearmost surface of the second group II is within the limits set forth above, and this optical length may be increased in order to flatten the image field, particularly a sagittal image field over a photographing angle as wide as 94.5°. If this optical length is less than $0.3f$, the sagittal image field of an intermediate photographing angle would be extremely short for correction purposes and flatness of the image field would deteriorate. However, if this optical length is greater than $0.7f$, the lens system would be undesirably prolonged and achievement of an objective which is relatively small and compact, one of the primary objects of the present invention, would be impossible.

The fourth group IV of the lenses of all of the objectives of the invention is composed of the first and second lenses $IV_A$ and $IV_B$ which are cemented to each other, the first lens $IV_A$ being a biconcave negative lens and the second lens $IV_B$ being a positive lens which has its convex surface directed forwardly toward the object to be photographed. These lenses satisfy the following:

Requirement 5: $0 < n_{IVA} - n_{IVB}/r_{IVb} < 0.5/f$

In a lens system according to the present invention where the back focal length is $1.85f$ or longer, the Petzval sum corresponds to an excessive correction and, as a result, it is extremely difficult for astigmatism occurring over a wide photographing angle to be improved. The limit of requirement 5 according to which the fraction thereof must be greater than 0 provides for the cemented surfaces a negative refractive power. Accordingly, the Petzval sum can be prevented from being excessively reduced and a preferred astigmatism can be achieved over the entire image field. If the negative refractive power of these cemented surfaces is intensified up to $0.5/f$ or higher, not only would the sagittal image field at a wide photographing angle be excessively corrected but in addition coma aberration would rapidly deteriorate. Therefore, the cemented negative lenses of the fourth group in all embodiments are arranged in accordance with requirement 5 above.

As was indicated above, in the embodiment of FIG. 6, the two lenses of the second group are separated by an air lens, and in this case requirement 3 above is replaced by the following:

Requirement 3': $0 < n_{IIA} - 1/r_{IIb} + 1 - n_{IIC}/r_{IIc} < 0.5/f$

This latter requirement defines a refractive power for the air lens in the second group within the same range as requirement 3 of the other embodiments with respect to the total refractive power of the cemented surfaces in the event that the second group is made up of two or more cemented lenses, and therefore with the embodiment of FIG. 6 the effects and results conforming with requirement 3 above are maintained.

Similarly, the above requirement 4 becomes in the embodiment of FIG. 6:

Requirement 4': $0.3f < d_4 + t_{IIA}/n_{IIA} + t_{IIB} + t_{IIC}/n_{IIC} < 0.7f$ In this latter requirement where $t_{IIB}$ represents the thickness of the air lens along the principal axis, it is brought out that the distance along the principal axis from the rearmost surface of the first group to the rearmost surface of the second group is within the same range as requirement 4 with respect to embodiments 1–5, where the second group of lenses is made up of two or three cemented lenses, so that with the embodiment of FIG. 6 the same requirements are fulfilled as with the remaining embodiments.

Of course, in all of the above requirements it will be understood that the symbols $r$, $t$, and $d$ respectively relate to the radii of the particular surfaces, the thicknesses of the particular lenses, and the distances along the principal axis of spaces between lenses, while $n$ is the refractive index of a particular lens with respect to the $d$-line. The character $f$ represents of course the focal length of the entire objective whereas in requirement $1 f_{IA + IB}$ represents the focal length resulting from the combination of the first two lenses of the first group.

Specific data in connection with the several embodiments of the invention respectively illustrated in FIGS. 1–6 are set forth in the following Tables. Thus, Tables I, III, V, VII, IX, and XI respectively give data for the embodiments of FIGS. 1–6, where the focal length $f$, $f_{IA + IB}$, the various radii $r$, lens thicknesses $t$, and distances $d$ along the principal axis between the lenses are given in mm, with the refractive indexes $n$ for the several lenses being with respect to the $d$-line, and with the various Abbe numbers $v$ for the several lenses also being indicated in these Tables.

Tables II, IV, VI, VIII, X, and XII are respectively Tables of von Seidel coefficients for the embodiments of FIGS. 1–6. With respect to these von Seidel coefficients, it is assumed that the diaphragm of each of the embodiments of the invention is situated between the third group III and the fourth group IV of the lenses of each objective, and $f = 1.0$ is assumed.

Although the von Seidel coefficients set forth in these Tables do not necessarily represent exact states of aberration of various types, it will be clearly understood from these von Seidel coefficients that each aberration is not of a particularly undesirable extent and the Petzval sums are not negative.

TABLE I

| Lens | | | | | Glass Constants | |
|---|---|---|---|---|---|---|
| | | | | | $n$ | $v$ |
| 1 | $r_1 =$ | 174.64 | $t_1 =$ | 13.64 | $n_1 = 1.72000$ | $v_1 = 50.3$ |
| | $r_2 =$ | 103.78 | $d_1 =$ | 26.70 | | |
| | $r_3 =$ | 182.73 | | | | |

TABLE I—Continued

| Lens | | | | | | Glass Constants $n$ | $\nu$ |
|---|---|---|---|---|---|---|---|
| 2 | | | $t_2=$ | 9.55 | | $n_2=1.71700$ | $\nu_2=47.9$ |
| | $r_4=$ | 106.48 | $d_2=$ | 21.90 | | | |
| | $r_5=$ | 212.01 | | | | | |
| 3 | | | $t_3=$ | 38.11 | | $n_3=1.69680$ | $\nu_3=55.6$ |
| | $r_6=$ | −845.70 | $d_3=$ | 0.97 | | | |
| | $r_7=$ | 120.10 | | | | | |
| 4 | | | $t_4=$ | 5.26 | | $n_4=1.72000$ | $\nu_4=50.3$ |
| | $r_8=$ | 57.33 | $d_4=$ | 22.42 | | | |
| | $r_9=$ | −531.80 | | | | | |
| 5 | | | $t_5=$ | 5.60 | | $n_5=1.70154$ | $\nu_5=41.1$ |
| | $r_{10}=$ | 60.16 | | | | | |
| 6 | | | $t_6=$ | 46.20 | | $n_6=1.67270$ | $\nu_6=32.2$ |
| | $r_{11}=$ | −503.70 | $d_6=$ | 0.49 | | | |
| | $r_{12}=$ | 138.77 | | | | | |
| 7 | | | $t_7=$ | 40.93 | | $n_7=1.60717$ | $\nu_7=40.2$ |
| | $r_{13}=$ | −102.62 | $d_7=$ | 19.05 | | | |
| | $r_{14}=$ | −64.23 | | | | | |
| 8 | | | $t_8=$ | 7.26 | | $n_8=1.74000$ | $\nu_8=28.2$ |
| | $r_{15}=$ | 81.46 | | | | | |
| 9 | | | $t_9=$ | 12.38 | | $n_9=1.58144$ | $\nu_9=40.8$ |
| | $r_{16}=$ | −557.20 | $d_9=$ | 4.73 | | | |
| | $r_{17}=$ | −128.22 | | | | | |
| 10 | | | $t_{10}=$ | 12.86 | | $n_{10}=1.69100$ | $\nu_{10}=54.8$ |
| | $r_{18}=$ | −64.43 | $d_{10}=$ | 0.49 | | | |
| | $r_{19}=$ | −3491.00 | | | | | |
| 11 | | | $t_{11}=$ | 14.28 | | $n_{11}=1.64000$ | $\nu_{11}=60.2$ |
| | $r_{20}=$ | −123.10 | | | | | |

$f = 99.8$
aperture ratio = 1:3.3
viewing angle = 94.5°
$bf = 185.2$
$f_{IA + IB} = -183.7$

TABLE II

| Surface | B | F | C | P | E |
|---|---|---|---|---|---|
| 1 | 0.04544 | 0.02351 | 0.01216 | 0.23926 | 0.13007 |
| 2 | −0.54323 | 0.15234 | −0.04272 | −0.40262 | 0.12489 |
| 3 | 0.21727 | 0.06235 | 0.01789 | 0.22811 | 0.07059 |
| 4 | −1.38659 | 0.25761 | −0.04786 | −0.39145 | 0.08162 |
| 5 | 0.65420 | 0.10411 | 0.01657 | 0.19334 | 0.03341 |
| 6 | −0.00007 | 0.00085 | −0.01057 | 0.04847 | −0.47339 |
| 7 | 0.37736 | 0.12329 | 0.04028 | 0.34791 | 0.12683 |
| 8 | −9.84798 | 1.47540 | −0.22104 | −0.72882 | 0.14231 |
| 9 | 0.20794 | 0.20684 | 0.20576 | −0.07739 | 0.12770 |
| 10 | −1.18804 | 0.16981 | −0.02427 | −0.01681 | 0.00587 |
| 11 | −0.20099 | −0.20060 | −0.20022 | 0.07970 | −0.12029 |
| 12 | 5.67611 | 0.68202 | 0.08195 | 0.27174 | 0.04250 |
| 13 | 10.63278 | −3.28111 | 1.01250 | 0.36747 | −0.42584 |
| 14 | −19.81702 | 4.07501 | −0.83795 | −0.66091 | 0.30821 |
| 15 | −5.11986 | −0.81722 | −0.13044 | −0.07061 | −0.03209 |
| 16 | −0.43191 | −0.38712 | −0.34751 | 0.06586 | −0.25264 |
| 17 | 0.06305 | −0.10615 | 0.17872 | −0.31811 | 0.23469 |
| 18 | 12.02423 | −1.23415 | 0.12667 | 0.63306 | −0.07798 |
| 19 | −0.00164 | 0.00695 | −0.02962 | −0.01116 | 0.17351 |
| 20 | 11.48488 | −1.25008 | 0.13607 | 0.31643 | −0.04925 |
| SUM | 2.84592 | 0.06336 | −0.06364 | 0.11345 | 0.17073 | where B designates spherical aberration, F designates coma aberration, C designates astigmatism, P designates curvature of image field or Petzval terms, and E is a coefficient of distortion.

TABLE III

| Lens | | | | | Glass Constants $n$ | $\nu$ |
|---|---|---|---|---|---|---|
| 1 | $r_1=$ | 171.12 | $t_1=$ | 13.65 | $n_1=1.72000$ | $\nu_1=50.3$ |
| | $r_2=$ | 104.27 | $d_1=$ | 26.72 | | |
| | $r_3=$ | 173.51 | | | | |

TABLE III—Continued

| Lens | | | | | Glass Constants | |
|---|---|---|---|---|---|---|
| | | | | | $n$ | $\nu$ |
| 2 | $r_4=$ | 106.98 | $t_2=$ | 9.56 | $n_2=1.71700$ | $\nu_2=47.9$ |
| | $r_5=$ | 196.43 | $d_2=$ | 21.50 | | |
| 3 | $r_6=$ | −1229.00 | $t_3=$ | 38.13 | $n_3=1.69680$ | $\nu_3=55.6$ |
| | $r_7=$ | 130.90 | $d_3=$ | 0.98 | | |
| 4 | $r_8=$ | 56.24 | $t_4=$ | 5.27 | $n_4=1.72000$ | $\nu_4=50.3$ |
| | $r_9=$ | −479.70 | $d_4=$ | 22.43 | | |
| 5 | $r_{10}=$ | −89.75 | $t_5=$ | 46.18 | $n_5=1.66680$ | $\nu_5=33.1$ |
| 6 | $r_{11}=$ | −360.70 | $t_6=$ | 5.61 | $n_6=1.72000$ | $\nu_6=50.3$ |
| | $r_{12}=$ | 148.02 | $d_6=$ | 0.49 | | |
| 7 | $r_{13}=$ | −102.22 | $t_7=$ | 40.97 | $n_7=1.60717$ | $\nu_7=40.2$ |
| | $r_{14}=$ | −65.58 | $d_7=$ | 19.06 | | |
| 8 | $r_{15}=$ | 81.44 | $t_8=$ | 7.27 | $n_8=1.74000$ | $\nu_8=28.2$ |
| 9 | $r_{16}=$ | −817.00 | $t_9=$ | 12.39 | $n_9=1.58144$ | $\nu_9=40.8$ |
| | $r_{17}=$ | −134.67 | $d_9=$ | 4.73 | | |
| 10 | $r_{18}=$ | −69.12 | $t_{10}=$ | 12.87 | $n_{10}=1.69100$ | $\nu_{10}=54.8$ |
| | $r_{19}=$ | −2190.00 | $d_{10}=$ | 0.49 | | |
| 11 | $r_{20}=$ | −106.64 | $t_{11}=$ | 14.29 | $n_{11}=1.64000$ | $\nu_{11}=60.2$ |

$f = 100.0$
aperture ratio = 1:3.3
viewing angle = 94.5°
$bf = 185.4$
$f_{IA + IB} = -197.9$

TABLE IV

| Surface | B | F | C | P | E |
|---|---|---|---|---|---|
| 1 | 0.04860 | 0.02226 | 0.01020 | 0.24467 | 0.11676 |
| 2 | −0.51819 | 0.14998 | −0.04341 | −0.40154 | 0.12878 |
| 3 | 0.22529 | 0.05572 | 0.01378 | 0.24072 | 0.06294 |
| 4 | −1.23704 | 0.22398 | −0.04055 | −0.39041 | 0.07803 |
| 5 | 0.62073 | 0.09503 | 0.01455 | 0.20910 | 0.03424 |
| 6 | −0.00001 | 0.00014 | −0.00227 | 0.03342 | −0.50284 |
| 7 | 0.23548 | 0.10715 | 0.04875 | 0.31985 | 0.16772 |
| 8 | −9.99772 | 1.56197 | −0.24403 | −0.74445 | 0.15443 |
| 9 | 0.21716 | 0.21290 | 0.20874 | −0.08341 | 0.12287 |
| 10 | −0.05955 | 0.02974 | −0.01485 | −0.02068 | 0.01774 |
| 11 | −0.08588 | −0.13347 | −0.20744 | 0.11607 | −0.14200 |
| 12 | 4.69413 | 0.66510 | 0.09424 | 0.25527 | 0.04952 |
| 13 | 10.05790 | −3.14920 | 0.98604 | 0.36965 | −0.42448 |
| 14 | −18.07908 | 3.80844 | −0.80227 | −0.64862 | 0.30564 |
| 15 | −4.90620 | −0.80994 | −0.13371 | −0.07077 | −0.03376 |
| 16 | −0.64671 | −0.50043 | −0.38724 | 0.04501 | −0.26482 |
| 17 | 0.03321 | −0.08252 | 0.20506 | −0.30349 | 0.24459 |
| 18 | 7.60874 | −0.94855 | 0.11825 | 0.59130 | −0.08846 |
| 19 | 0.00002 | −0.00043 | 0.00908 | −0.01782 | 0.18559 |
| 20 | 14.48302 | −1.25726 | 0.10914 | 0.36601 | −0.04125 |
| SUM | 2.69390 | 0.05060 | −0.05795 | 0.10988 | 0.17126 | where B designates spherical aberration, F designates coma aberration, C designates astigmatism, P designates curvature of image field or Petzval terms, and E is a coefficient of distortion.

TABLE V

| Lens | | | | | Glass Constants | |
|---|---|---|---|---|---|---|
| | | | | | $n$ | $\nu$ |
| 1 | $r_1=$ | 172.96 | $t_1=$ | 13.66 | $n_1=1.72000$ | $\nu_1=50.3$ |
| | $r_2=$ | 103.82 | $d_1=$ | 26.73 | | |
| | $r_3=$ | 171.42 | | | | |

TABLE V – Continued

| Lens | | | | | | Glass Constants | |
|---|---|---|---|---|---|---|---|
| | | | | | | $n$ | $\nu$ |
| 2 | $r_4=$ | 109.31 | $t_2=$ | 9.56 | $n_2=1.71700$ | $\nu_2=47.9$ | |
| | | | $d_2=$ | 21.51 | | | |
| | $r_5=$ | 201.50 | | | | | |
| 3 | | | $t_3=$ | 38.15 | $n_3=1.69680$ | $\nu_3=55.6$ | |
| | $r_6=$ | −1240.00 | | | | | |
| | | | $d_3=$ | 0.98 | | | |
| | $r_7=$ | 123.57 | | | | | |
| 4 | | | $t_4=$ | 5.27 | $n_4=1.72000$ | $\nu_4=50.3$ | |
| | $r_8=$ | 55.34 | | | | | |
| | | | $d_4=$ | 22.44 | | | |
| | $r_9=$ | −513.75 | | | | | |
| 5 | | | $t_5=$ | 5.61 | $n_5=1.70154$ | $\nu_5=41.1$ | |
| | $r_{10}=$ | 121.68 | | | | | |
| 6 | | | $t_6=$ | 40.59 | $n_6=1.68893$ | $\nu_6=31.2$ | |
| | $r_{11}=$ | −196.09 | | | | | |
| 7 | | | $t_7=$ | 5.61 | $n_7=1.72000$ | $\nu_7=50.3$ | |
| | $r_{12}=$ | −506.40 | | | | | |
| | | | $d_7=$ | 0.49 | | | |
| | $r_{13}=$ | 148.27 | | | | | |
| 8 | | | $t_8=$ | 40.98 | $n_8=1.60717$ | $\nu_8=40.2$ | |
| | $r_{14}=$ | −102.34 | | | | | |
| | | | $d_8=$ | 19.07 | | | |
| | $r_{15}=$ | −65.57 | | | | | |
| 9 | | | $t_9=$ | 7.27 | $n_9=1.74000$ | $\nu_9=28.2$ | |
| | $r_{16}=$ | 81.48 | | | | | |
| 10 | | | $t_{10}=$ | 12.39 | $n_{10}=1.58144$ | $\nu_{10}=40.8$ | |
| | $r_{17}=$ | −704.80 | | | | | |
| | | | $d_{10}=$ | 4.73 | | | |
| | $r_{18}=$ | −142.73 | | | | | |
| 11 | | | $t_{11}=$ | 12.88 | $n_{11}=1.69100$ | $\nu_{11}=54.8$ | |
| | $r_{19}=$ | −69.63 | | | | | |
| | | | $d_{11}=$ | 0.49 | | | |
| | $r_{20}=$ | −1532.00 | | | | | |
| 12 | | | $t_{12}=$ | 14.29 | $n_{12}=1.64000$ | $\nu_{12}=60.2$ | |
| | $r_{21}=$ | −106.63 | | | | | |

$f = 100.0$
aperture ratio = 1:3.3
viewing angle = 94.5°
$bf = 185.5$
$f_{IA + IB} = -202.5$

TABLE VI

| Surface | B | F | C | P | E |
|---|---|---|---|---|---|
| 1 | 0.04706 | 0.02280 | 0.01105 | 0.24206 | 0.12264 |
| 2 | −0.53719 | 0.15609 | −0.04536 | −0.40326 | 0.13036 |
| 3 | 0.24002 | 0.05529 | 0.01274 | 0.24364 | 0.05906 |
| 4 | −1.16464 | 0.18826 | −0.03043 | −0.38208 | 0.06668 |
| 5 | 0.57716 | 0.10394 | 0.01872 | 0.20383 | 0.04008 |
| 6 | −0.00001 | 0.00012 | −0.00192 | 0.03312 | −0.50327 |
| 7 | 0.27547 | 0.11369 | 0.04692 | 0.33881 | 0.15920 |
| 8 | −10.04239 | 1.50918 | −0.22680 | −0.75654 | 0.14778 |
| 9 | 0.22084 | 0.21804 | 0.21528 | −0.08026 | 0.13331 |
| 10 | −0.11856 | 0.00416 | −0.00015 | −0.00361 | 0.00013 |
| 11 | 0.00085 | −0.00168 | 0.00331 | −0.00546 | 0.00422 |
| 12 | −0.19644 | −0.20477 | −0.21345 | 0.08268 | −0.13632 |
| 13 | 4.75730 | 0.71639 | 0.10788 | 0.25484 | 0.05462 |
| 14 | 9.46925 | −2.92622 | 0.90427 | 0.36921 | −0.39354 |
| 15 | −17.36368 | 3.53611 | −0.72013 | −0.64870 | 0.27876 |
| 16 | −5.03883 | −0.87273 | −0.15116 | −0.07073 | −0.03843 |
| 17 | −0.61634 | −0.49311 | −0.39452 | 0.05217 | −0.27389 |
| 18 | 0.01498 | −0.05753 | 0.22104 | −0.28634 | 0.25089 |
| 19 | 7.76674 | −0.89411 | 0.10293 | 0.58695 | −0.07942 |
| 20 | −0.00008 | 0.00049 | −0.00313 | −0.02548 | 0.18135 |
| 21 | 14.50197 | −1.12498 | 0.08727 | 0.36604 | −0.03516 |
| SUM | 2.79348 | 0.04943 | −0.05563 | 0.11089 | 0.16904 | where B designates spherical aberration, F designates coma aberration, C designates astigmatism, P designates curvature of image field or Petzval terms, and E is a coefficient of distortion.

TABLE VII

| Lens | | | | | Glass Constants | |
|---|---|---|---|---|---|---|
| | | | | | $n$ | $v$ |
| 1 | $r_1=$ | 175.93 | $t_1=$ | 13.66 | $n_1=1.72000$ | $v_1=50.3$ |
| | $r_2=$ | 106.10 | $d_1=$ | 26.73 | | |
| 2 | $r_3=$ | 183.28 | $t_2=$ | 9.56 | $n_2=1.71700$ | $v_2=47.9$ |
| | $r_4=$ | 106.21 | $d_2=$ | 21.51 | | |
| 3 | $r_5=$ | 212.00 | $t_3=$ | 38.15 | $n_3=1.69680$ | $v_3=55.6$ |
| | $r_6=$ | −856.60 | $d_3=$ | 0.98 | | |
| 4 | $r_7=$ | 120.97 | $t_4=$ | 5.27 | $n_4=1.72000$ | $v_4=50.3$ |
| | $r_8=$ | 57.54 | $d_4=$ | 22.44 | | |
| 5 | $r_9=$ | −546.30 | $t_5=$ | 5.61 | $n_5=1.70154$ | $v_5=41.1$ |
| 6 | $r_{10}=$ | 58.11 | $t_6=$ | 46.24 | $n_6=1.67270$ | $v_6=32.2$ |
| | $r_{11}=$ | −535.80 | $d_6=$ | 0.49 | | |
| 7 | $r_{12}=$ | 140.05 | $t_7=$ | 7.32 | $n_7=1.62374$ | $v_7=47.0$ |
| 8 | $r_{13}=$ | 102.00 | $t_8=$ | 33.66 | $n_8=1.60717$ | $v_8=40.2$ |
| | $r_{14}=$ | −103.33 | $d_8=$ | 19.07 | | |
| 9 | $r_{15}=$ | −64.47 | $t_9=$ | 7.27 | $n_9=1.74000$ | $v_9=28.2$ |
| 10 | $r_{16}=$ | 81.54 | $t_{10}=$ | 12.39 | $n_{10}=1.58144$ | $v_{10}=40.8$ |
| | $r_{17}=$ | −540.30 | $d_{10}=$ | 4.73 | | |
| 11 | $r_{18}=$ | −129.84 | $t_{11}=$ | 12.88 | $n_{11}=1.69100$ | $v_{11}=54.8$ |
| | $r_{19}=$ | −64.55 | $d_{11}=$ | 0.49 | | |
| 12 | $r_{20}=$ | −3944.00 | $t_{12}=$ | 14.29 | $n_{12}=1.64000$ | $v_{12}=60.2$ |
| | $r_{21}=$ | −122.67 | | | | |

$f = 100.0$
aperture ratio = 1:3.3
viewing angle = 94.5°
$bf = 185.4$
$f_{IA + IB} = -187.0$

TABLE VIII

| Surface | B | F | C | P | E |
|---|---|---|---|---|---|
| 1 | 0.04468 | 0.02398 | 0.01287 | 0.23791 | 0.13461 |
| 2 | −0.50116 | 0.12472 | −0.03104 | −0.39449 | 0.10590 |
| 3 | 0.20439 | 0.06529 | 0.02085 | 0.22782 | 0.07943 |
| 4 | −1.35513 | 0.23045 | −0.03919 | −0.39313 | 0.07352 |
| 5 | 0.62806 | 0.11398 | 0.02068 | 0.19368 | 0.03890 |
| 6 | −0.00006 | 0.00067 | −0.00816 | 0.04793 | −0.48345 |
| 7 | 0.35342 | 0.12649 | 0.04527 | 0.34600 | 0.14004 |
| 8 | −9.46579 | 1.25944 | −0.16757 | −0.72742 | 0.11908 |
| 9 | 0.20316 | 0.20780 | 0.21255 | −0.07546 | 0.14022 |
| 10 | −1.23969 | 0.16199 | −0.02117 | −0.01744 | 0.00504 |
| 11 | −0.22073 | −0.21481 | −0.20905 | 0.07505 | −0.13041 |
| 12 | 5.54627 | 0.78545 | 0.11123 | 0.27426 | 0.05459 |
| 13 | −0.14405 | −0.01144 | −0.00091 | −0.00622 | −0.00057 |
| 14 | 9.85416 | −2.93504 | 0.87420 | 0.36557 | −0.36926 |
| 15 | −18.77857 | 3.59121 | −0.68678 | −0.65959 | 0.25748 |
| 16 | −5.18202 | −0.92005 | −0.16335 | −0.07066 | −0.04155 |
| 17 | −0.44775 | −0.40614 | −0.36839 | 0.06804 | −0.27244 |
| 18 | 0.05347 | −0.09940 | 0.18481 | −0.31469 | 0.24147 |
| 19 | 11.82323 | −1.00814 | 0.08596 | 0.63298 | −0.06130 |
| 20 | −0.00113 | 0.00544 | −0.02613 | −0.00989 | 0.17316 |
| 21 | 11.55856 | −1.04206 | 0.09395 | 0.31809 | −0.03715 |
| SUM | 2.93333 | 0.05983 | −0.05937 | 0.11834 | 0.16733 | where B designates spherical aberration, F designates coma aberration, C designates astigmatism, P designates curvature of image field or Petzval terms, and E is a coefficient of distortion.

TABLE IX

| Lens | | | | | Glass Constants $n$ | $\nu$ |
|------|---|---|---|---|---|---|
| 1 | $r_1=$ | 173.11 | $t_1=$ | 13.67 | $n_1=1.72000$ | $\nu_1=50.3$ |
|   | $r_2=$ | 103.83 | $d_1=$ | 26.76 | | |
| 2 | $r_3=$ | 171.25 | $t_2=$ | 9.57 | $n_2=1.71700$ | $\nu_2=47.9$ |
|   | $r_4=$ | 109.31 | $d_2=$ | 21.53 | | |
| 3 | $r_5=$ | 201.01 | $t_3=$ | 38.18 | $n_3=1.69680$ | $\nu_3=55.6$ |
|   | $r_6=$ | −1254.00 | $d_3=$ | 0.98 | | |
| 4 | $r_7=$ | 122.85 | $t_4=$ | 5.27 | $n_4=1.72000$ | $\nu_4=50.3$ |
|   | $r_8=$ | 55.36 | $d_4=$ | 22.46 | | |
| 5 | $r_9=$ | −517.40 | $t_5=$ | 5.62 | $n_5=1.71264$ | $\nu_5=43.2$ |
| 6 | $r_{10}=$ | 99.37 | $t_6=$ | 40.63 | $n_6=1.68893$ | $\nu_6=31.2$ |
| 7 | $r_{11}=$ | −278.85 | $t_7=$ | 5.62 | $n_7=1.67790$ | $\nu_7=50.6$ |
|   | $r_{12}=$ | −512.70 | $d_7=$ | 0.49 | | |
| 8 | $r_{13}=$ | 148.43 | $t_8=$ | 40.99 | $n_8=1.60717$ | $\nu_8=40.2$ |
|   | $r_{14}=$ | −102.60 | $d_8=$ | 19.09 | | |
| 9 | $r_{15}=$ | −65.70 | $t_9=$ | 7.28 | $n_9=1.74000$ | $\nu_9=28.2$ |
| 10 | $r_{16}=$ | 81.55 | $t_{10}=$ | 12.40 | $n_{10}=1.58144$ | $\nu_{10}=40.8$ |
|   | $r_{17}=$ | −715.40 | $d_{10}=$ | 4.74 | | |
| 11 | $r_{18}=$ | −142.77 | $t_{11}=$ | 12.89 | $n_{11}=1.69100$ | $\nu_{11}=54.8$ |
|   | $r_{19}=$ | −69.62 | $d_{11}=$ | 0.49 | | |
| 12 | $r_{20}=$ | −1492.00 | $t_{12}=$ | 14.31 | $n_{12}=1.64000$ | $\nu_{12}=60.2$ |
|   | $r_{21}=$ | −106.67 | | | | |

$f = 100.0$
aperture ratio = 1:3.3
viewing angle = 94.5°
$bf = 185.7$
$f_{IA + IB} = -202.6$

TABLE X

| Surface | B | F | C | P | E |
|---------|---|---|---|---|---|
| 1 | 0.04691 | 0.02280 | 0.01109 | 0.24181 | 0.12293 |
| 2 | −0.53734 | 0.15622 | −0.04542 | −0.40315 | 0.13041 |
| 3 | 0.24076 | 0.05519 | 0.01265 | 0.24384 | 0.05880 |
| 4 | −1.16413 | 0.18792 | −0.03033 | −0.38201 | 0.06656 |
| 5 | 0.57882 | 0.10381 | 0.01862 | 0.20429 | 0.03998 |
| 6 | −0.00001 | 0.00012 | −0.00190 | 0.03275 | −0.50311 |
| 7 | 0.27934 | 0.11419 | 0.04668 | 0.34074 | 0.15837 |
| 8 | −9.95912 | 1.48434 | −0.22123 | −0.75613 | 0.14567 |
| 9 | 0.21857 | 0.21775 | 0.21694 | −0.08042 | 0.13600 |
| 10 | −0.32347 | 0.02158 | −0.00144 | −0.00825 | 0.00065 |
| 11 | −0.00002 | −0.00019 | −0.00155 | 0.00140 | −0.00120 |
| 12 | −0.19278 | −0.19980 | −0.20707 | 0.07880 | −0.13295 |
| 13 | 4.75598 | 0.71983 | 0.10895 | 0.25452 | 0.05501 |
| 14 | 9.46372 | −2.91476 | 0.89773 | 0.36821 | −0.38990 |
| 15 | −17.36521 | 3.51985 | −0.71316 | −0.64730 | 0.27582 |
| 16 | −5.04131 | −0.87613 | −0.15226 | −0.07066 | −0.03874 |
| 17 | −0.62351 | −0.49669 | −0.39567 | 0.05139 | −0.27426 |
| 18 | 0.01512 | −0.05776 | 0.22061 | −0.28621 | 0.25054 |
| 19 | 7.82478 | −0.89062 | 0.10137 | 0.58693 | −0.07834 |
| 20 | −0.00011 | 0.00066 | −0.00397 | −0.02616 | 0.18055 |
| 21 | 14.53926 | −1.11339 | 0.08526 | 0.36583 | −0.03454 |
| SUM | 2.75626 | 0.05491 | −0.05442 | 0.11021 | 0.16825 | where B designates spherical aberration, F designates coma aberration, C designates astigmatism, P designates curvature of image field or Petzval terms, and E is a coefficient of distortion.

TABLE XI

| Lens | | | | | Glass Constants | |
|---|---|---|---|---|---|---|
| | | | | | $n$ | $v$ |
| 1 | $r_1=$ | 176.83 | $t_1=$ | 13.65 | $n_1=1.72000$ | $v_1=50.3$ |
| | $r_2=$ | 102.62 | $d_1=$ | 26.72 | | |
| 2 | $r_3=$ | 171.91 | $t_2=$ | 9.56 | $n_2=1.71700$ | $v_2=47.9$ |
| | $r_4=$ | 113.18 | $d_2=$ | 21.50 | | |
| 3 | $r_5=$ | 214.61 | $t_3=$ | 38.13 | $n_3=1.69680$ | $v_3=55.6$ |
| | $r_6=$ | 1370.00 | $d_3=$ | 0.98 | | |
| 4 | $r_7=$ | 118.52 | $t_4=$ | 5.27 | $n_4=1.72000$ | $v_4=50.3$ |
| | $r_8=$ | 55.05 | $d_4=$ | 22.43 | | |
| 5 | $r_9=$ | −1499.00 | $t_5=$ | 5.61 | $n_5=1.69680$ | $v_5=55.6$ |
| | $r_{10}=$ | 149.72 | $d_5=$ | 4.39 | | |
| 6 | $r_{11}=$ | 160.19 | $t_6=$ | 38.86 | $n_6=1.68893$ | $v_6=31.2$ |
| | $r_{12}=$ | −570.70 | $d_6=$ | 0.49 | | |
| 7 | $r_{13}=$ | 178.68 | $t_7=$ | 40.97 | $n_7=1.60717$ | $v_7=40.2$ |
| | $r_{14}=$ | −99.96 | $d_7=$ | 19.06 | | |
| 8 | $r_{15}=$ | −66.77 | $t_8=$ | 7.26 | $n_8=1.74000$ | $v_8=28.2$ |
| 9 | $r_{16}=$ | 81.43 | $t_9=$ | 12.38 | $n_9=1.58144$ | $v_9=40.8$ |
| | $r_{17}=$ | −850.00 | $d_9=$ | 4.73 | | |
| 10 | $r_{18}=$ | −152.37 | $t_{10}=$ | 12.87 | $n_{10}=1.69100$ | $v_{10}=54.8$ |
| | $r_{19}=$ | −69.18 | $d_{10}=$ | 0.49 | | |
| 11 | $r_{20}=$ | −937.80 | $t_{11}=$ | 14.29 | $n_{11}=1.64000$ | $v_{11}=60.2$ |
| | $r_{21}=$ | 108.71 | | | | |

$f = 100.0$
aperture ratio = 1:3.3
viewing angle = 94.5°
$bf = 185.4$
$f_{1A + 1B} = -203.6$

TABLE XII

| Surface | B | F | C | P | E |
|---|---|---|---|---|---|
| 1 | 0.04403 | 0.02438 | 0.01350 | 0.23676 | 0.13855 |
| 2 | −0.58486 | 0.16484 | −0.04646 | −0.40798 | 0.12808 |
| 3 | 0.26152 | 0.05988 | 0.01371 | 0.2495 | 0.05877 |
| 4 | −1.10828 | 0.13721 | −0.01699 | −0.36901 | 0.04779 |
| 5 | 0.53207 | 0.12217 | 0.02805 | 0.19138 | 0.05039 |
| 6 | −0.00001 | 0.20046 | −0.01799 | 0.02998 | −0.47065 |
| 7 | 0.35793 | 0.13096 | 0.04792 | 0.35324 | 0.14678 |
| 8 | −10.55606 | 1.41674 | −0.19014 | −0.76052 | 0.12759 |
| 9 | 0.41740 | 0.28974 | 0.20112 | −0.02740 | 0.12058 |
| 10 | −10.23888 | −0.30357 | −0.00900 | −0.27432 | −0.00840 |
| 11 | 10.51709 | 0.41988 | 0.01676 | 0.25468 | 0.01084 |
| 12 | −0.13368 | −0.16198 | −0.19626 | 0.07149 | −0.15119 |
| 13 | 3.04525 | 0.66497 | 0.14521 | 0.21146 | 0.07788 |
| 14 | 10.26384 | −2.93029 | 0.83659 | 0.37799 | −0.34676 |
| 15 | −17.35898 | 3.27130 | −0.61648 | −0.63703 | 0.23622 |
| 16 | −4.99268 | −0.93541 | −0.17526 | −0.07077 | −0.04610 |
| 17 | −0.67201 | −0.52680 | −0.41297 | 0.04326 | −0.28982 |
| 18 | 0.00516 | −0.03442 | 0.22950 | −0.26822 | 0.25820 |
| 19 | 8.99666 | −0.84676 | 0.07970 | 0.59077 | −0.06310 |
| 20 | −0.00679 | 0.01516 | −0.03385 | −0.04162 | 0.16851 |
| 21 | 14.02089 | −0.92817 | 0.06144 | 0.35903 | −0.02783 |
| SUM | 2.80961 | 0.05032 | −0.04190 | 0.10611 | 0.16634 | where $B$ designates spherical aberration, $F$ designates coma aberration, $C$ designates astigmatism, $P$ designates curvature of image field or Petzval terms, and $E$ is a coefficients of distortion.

The exceedingly small extent of distortions or aberrations of various type which result with the objectives of the invention are particularly apparent from the graphs which accompany the drawings. Thus, it is apparent from FIGS. 1A–1E, which illustrate curves for various aberrations in the manner clear from FIGS. 1A–1E that the objective of FIG. 1 will have an exceedingly efficient performance while still achieving the above long back focal length, aperture ratio, and exceedingly wide photographing angle.

The same is true of the embodiment of FIG. 2. Thus it will be seen from FIGS. 2A-2C that an exceedingly effective performance is achieved from this embodiment. In the same way the graphs of FIGS. 3A-3C, FIGS. 4A-4C, FIGS. 5A-5C, and FIGS. 6A-6C respectively show that the objectives of FIGS. 3-6 are capable of providing an extremely effective performance with minimum distortion, aberration, and the like.

What is claimed is:

1. An extrawide-angle retrofocus objective having four lens element sections the first of which is situated at the front of the objective nearest to the object to be photographed and has a divergent effect, said first lens element section consisting of four elements arranged with air gaps respectively situated therebetween and the first, second and fourth of said elements of said first section, considered in the direction from the front toward the rear, being negative meniscus lenses respectively having convex surfaces directed forwardly toward the object, while the third of said four elements is a positive lens element, the second of said four lens element sections being situated behind the first, having an extremely weak refractive power in its entirety and including at least two but not more than three lens elements the first of which is nearest to the object and has a concave surface which is directed forward toward the object, the third of said lens element sections being situated behind the second and forming a positive lens system including at least one but not more than two lens elements, and the fourth of said lens element sections being situated behind the third and including from the front toward the rear a negative biconcave lens element, a positive lens having a convex surface of large curvature directed toward the object, a positive meniscus lens having a convex surface directed rearwardly toward the image plane, and a positive rear lens, the first and second lens elements of said fourth lens element section being cemented to each other at a forwardly directed convex surface of the second lens element of said fourth lens element section, and the remaining elements of said fourth lens element section being separated by air gaps.

2. The combination of claim 1 and wherein the lens elements of said second lens element section are cemented to each other and the sum of the refractive powers of their cemented surfaces being negative.

3. The combination of claim 1 and wherein said second lens element section consists of only two lens elements the first of which is a negative biconcave lens and the second of which is a positive lens separated from the first lens by a gap which has the configuration of a convex meniscus with respect to the object to be photographed.

4. An extrawide-angle retrofocus objective having the data shown in the following Table I in which focal length $f$, back focal length $bf$, combined focal length $f_{IA + IB}$ of lenses 1 and 2, the radii $r$, lens thicknesses $t$, and distances d between the lenses are in mm while $n$ is the refractive index with respect to the d-line for the lenses 1-11 and $v$ is the Abbe number for the lenses 1-11:

TABLE I

| Lens | | | | | Glass Constants | |
|---|---|---|---|---|---|---|
| | | | | | $n$ | $v$ |
| 1 | $r_1=$ | 174.64 | $t_1=$ | 13.64 | $n_1=1.72000$ | $v_1=50.3$ |
| | $r_2=$ | 103.78 | $d_1=$ | 26.70 | | |
| 2 | $r_3=$ | 182.73 | $t_2=$ | 9.55 | $n_2=1.71700$ | $v_2=47.9$ |
| | $r_4=$ | 106.48 | $d_2=$ | 21.90 | | |
| 3 | $r_5=$ | 212.01 | $t_3=$ | 38.11 | $n_3=1.69680$ | $v_3=55.6$ |
| | $r_6=$ | -845.70 | $d_3=$ | 0.97 | | |
| 4 | $r_7=$ | 120.10 | $t_4=$ | 5.26 | $n_4=1.72000$ | $v_4=50.3$ |
| | $r_8=$ | 57.33 | $d_4=$ | 22.42 | | |
| 5 | $r_9=$ | -531.80 | $t_5=$ | 5.60 | $n_5=1.70154$ | $v_5=41.1$ |
| 6 | $r_{10}=$ | 60.16 | $t_6=$ | 46.20 | $n_6=1.67270$ | $v_6=32.2$ |
| | $r_{11}=$ | -503.70 | $d_6=$ | 0.49 | | |
| 7 | $r_{12}=$ | 138.77 | $t_7=$ | 40.93 | $n_7=1.60717$ | $v_7=40.2$ |
| | $r_{13}=$ | -102.62 | $d_7=$ | 19.05 | | |
| 8 | $r_{14}=$ | -64.23 | $t_8=$ | 7.26 | $n_8=1.74000$ | $v_8=28.2$ |
| 9 | $r_{15}=$ | 81.46 | $t_9=$ | 12.38 | $n_9=1.58144$ | $v_9=40.8$ |
| | $r_{16}=$ | -557.20 | $d_9=$ | 4.73 | | |
| 10 | $r_{17}=$ | -128.22 | $t_{10}=$ | 12.86 | $n_{10}=1.69100$ | $v_{10}=54.8$ |
| | $r_{18}=$ | -64.43 | $d_{10}=$ | 0.49 | | |
| 11 | $r_{19}=$ | -3491.00 | $t_{11}=$ | 14.28 | $n_{11}=1.64000$ | $v_{11}=60.2$ |
| | $r_{20}=$ | -123.10 | | | | |

$f = 99.8$
aperture ratio = 1:3.3
viewing angle = 94.5°
$bf = 185.2$
$f_{IA + IB} = -183.7$ 5. An extrawide-angle retrofocus objective having the data shown in the following Table III in which focal length $f$, back focal length $bf$, combined focal length $f_{1A + 1B}$ of lenses 1 and 2, the radii $r$, lens thicknesses $t$, and distances $d$ between the lenses are in mm while $n$ is the refractive index with respect to the $d$-line for the lenses 1-11 and $v$ is the Abbe number for the lenses 1-11:

TABLE III

| Lens | | | | | Glass Constants $n$ | $v$ |
|---|---|---|---|---|---|---|
| 1 | $r_1=$ | 171.12 | $t_1=$ | 13.65 | $n_1=1.72000$ | $v_1=50.3$ |
|   | $r_2=$ | 104.27 | $d_1=$ | 26.72 | | |
| 2 | $r_3=$ | 173.51 | $t_2=$ | 9.56 | $n_2=1.71700$ | $v_2=47.9$ |
|   | $r_4=$ | 106.98 | $d_2=$ | 21.50 | | |
| 3 | $r_5=$ | 196.43 | $t_3=$ | 38.13 | $n_3=1.69680$ | $v_3=55.6$ |
|   | $r_6=$ | −1229.00 | $d_3=$ | 0.98 | | |
| 4 | $r_7=$ | 130.90 | $t_4=$ | 5.27 | $n_4=1.72000$ | $v_4=50.3$ |
|   | $r_8=$ | 56.24 | $d_4=$ | 22.43 | | |
| 5 | $r_9=$ | −479.70 | $t_5=$ | 46.18 | $n_5=1.66680$ | $v_5=33.1$ |
|   | $r_{10}=$ | −89.75 | | | | |
| 6 | $r_{11}=$ | −360.70 | $t_6=$ | 5.61 | $n_6=1.72000$ | $v_6=50.3$ |
|   |   |   | $d_6=$ | 0.49 | | |
| 7 | $r_{12}=$ | 148.02 | $t_7=$ | 40.97 | $n_7=1.60717$ | $v_7=40.2$ |
|   | $r_{13}=$ | −102.22 | $d_7=$ | 19.06 | | |
| 8 | $r_{14}=$ | −65.58 | $t_8=$ | 7.27 | $n_8=1.74000$ | $v_8=28.2$ |
| 9 | $r_{15}=$ | 81.44 | $t_9=$ | 12.39 | $n_9=1.58144$ | $v_9=40.8$ |
|   | $r_{16}=$ | −817.00 | $d_9=$ | 4.73 | | |
| 10 | $r_{17}=$ | −134.67 | $t_{10}=$ | 12.87 | $n_{10}=1.69100$ | $v_{10}=54.8$ |
|   | $r_{18}=$ | −69.12 | $d_{10}=$ | 0.49 | | |
| 11 | $r_{19}=$ | −2190.00 | $t_{11}=$ | 14.29 | $n_{11}=1.64000$ | $v_{11}=60.2$ |
|   | $r_{20}=$ | −106.64 | | | | |

$f = 100.0$
aperture ratio = 1:3.3
viewing angle = 94.5°
$bf = 185.4$
$f_{1A + 1B} = -197.9$ 6. An extrawide-angle retrofocus objective having the data shown in the following Table V in which focal length $f$, back focal length $bf$, combined focal length $f_{1A + 1B}$ of lenses 1 and 2, the radii $r$, lens thicknesses $t$, and distances $d$ between the lenses are in mm while $n$ is the refractive index with respect to the $d$-line for the lenses 1-12 and $v$ is the Abbe number for the lenses 1-12:

TABLE V

| Lens | | | | | Glass Constants $n$ | $v$ |
|---|---|---|---|---|---|---|
| 1 | $r_1=$ | 172.96 | $t_1=$ | 13.66 | $n_1=1.72000$ | $v_1=50.3$ |
|   | $r_2=$ | 103.82 | $d_1=$ | 26.73 | | |
| 2 | $r_3=$ | 171.42 | $t_2=$ | 9.56 | $n_2=1.71700$ | $v_2=47.9$ |
|   | $r_4=$ | 109.31 | $d_2=$ | 21.51 | | |
| 3 | $r_5=$ | 201.50 | $t_3=$ | 38.15 | $n_3=1.69680$ | $v_3=55.6$ |
|   | $r_6=$ | −1240.00 | $d_3=$ | 0.98 | | |
|   | $r_7=$ | 123.57 | | | | |

TABLE V—Continued

| Lens | | | | | Glass Constants | |
|---|---|---|---|---|---|---|
| | | | | | $n$ | $v$ |
| 4 | $r_8=$ | 55.34 | $t_4=$ | 5.27 | $n_4=1.72000$ | $v_4=50.3$ |
| | $r_9=$ | −513.75 | $d_4=$ | 22.44 | | |
| 5 | $r_{10}=$ | 121.68 | $t_5=$ | 5.61 | $n_5=1.70154$ | $v_5=41.1$ |
| 6 | $r_{11}=$ | −196.09 | $t_6=$ | 40.59 | $n_6=1.68893$ | $v_6=31.2$ |
| 7 | $r_{12}=$ | −506.40 | $t_7=$ | 5.61 | $n_7=1.72000$ | $v_7=50.3$ |
| | | | $d_7=$ | 0.49 | | |
| 8 | $r_{13}=$ | 148.27 | $t_8=$ | 40.98 | $n_8=1.60717$ | $v_8=40.2$ |
| | $r_{14}=$ | −102.34 | $d_8=$ | 19.07 | | |
| 9 | $r_{15}=$ | −65.57 | $t_9=$ | 7.27 | $n_9=1.74000$ | $v_9=28.2$ |
| | $r_{16}=$ | 81.48 | | | | |
| 10 | $r_{17}=$ | −704.80 | $t_{10}=$ | 12.39 | $n_{10}=1.58144$ | $v_{10}=40.8$ |
| | | | $d_{10}=$ | 4.73 | | |
| 11 | $r_{18}=$ | −142.73 | $t_{11}=$ | 12.88 | $n_{11}=1.69100$ | $v_{11}=54.8$ |
| | $r_{19}=$ | −69.63 | $d_{11}=$ | 0.49 | | |
| 12 | $r_{20}=$ | −1532.00 | $t_{12}=$ | 14.29 | $n_{12}=1.64000$ | $v_{12}=60.2$ |
| | $r_{21}=$ | −106.63 | | | | |

$f = 100.0$
aperture ratio = 1:3.3
viewing angle = 94.5°
$bf = 185.5$
$f_{IA + IB} = -202.5$ 7. An extrawide-angle retrofocus objective having the data shown in the following Table VII in which focal length $f$, back focal length $bf$, combined focal length $f_{IA + IB}$ of lenses 1 and 2, the radii $r$, lens thicknesses $t$, and distances $d$ between the lenses are in mm while $n$ is the refractive index with respect to the $d$-line for the lenses 1–12 and $v$ is the Abbe number for the lenses 1–12:

TABLE VII

| Lens | | | | | Glass Constants | |
|---|---|---|---|---|---|---|
| | | | | | $n$ | $v$ |
| 1 | $r_1=$ | 175.93 | $t_1=$ | 13.66 | $n_1=1.72000$ | $v_1=50.3$ |
| | $r_2=$ | 106.10 | $d_1=$ | 26.73 | | |
| 2 | $r_3=$ | 183.28 | $t_2=$ | 9.56 | $n_2=1.71700$ | $v_2=47.9$ |
| | $r_4=$ | 106.21 | $d_2=$ | 21.51 | | |
| 3 | $r_5=$ | 212.00 | $t_3=$ | 38.15 | $n_3=1.69680$ | $v_3=55.6$ |
| | $r_6=$ | −856.60 | $d_3=$ | 0.98 | | |
| 4 | $r_7=$ | 120.97 | $t_4=$ | 5.27 | $n_4=1.72000$ | $v_4=50.3$ |
| | $r_8=$ | 57.54 | $d_4=$ | 22.44 | | |
| 5 | $r_9=$ | −546.30 | $t_5=$ | 5.61 | $n_5=1.70154$ | $v_5=41.1$ |
| 6 | $r_{10}=$ | 58.11 | $t_6=$ | 46.24 | $n_6=1.67270$ | $v_6=32.2$ |
| | $r_{11}=$ | −535.80 | $d_6=$ | 0.49 | | |
| 7 | $r_{12}=$ | 140.05 | $t_7=$ | 7.32 | $n_7=1.62374$ | $v_7=47.0$ |
| 8 | $r_{13}$ | 102.00 | $t_8=$ | 33.66 | $n_8=1.60717$ | $v_8=40.2$ |
| | $r_{14}=$ | −103.33 | $d_8=$ | 19.07 | | |
| 9 | $r_{15}=$ | −64.47 | $t_9=$ | 7.27 | $n_9=1.74000$ | $v_9=28.2$ |
| | $r_{16}=$ | 81.54 | | | | |
| 10 | $r_{17}=$ | −540.30 | $t_{10}=$ | 12.39 | $n_{10}=1.58144$ | $v_{10}=40.8$ |
| | $r_{18}=$ | −129.84 | $d_{10}=$ | 4.73 | | |

TABLE VII—Continued

| Lens | | | | Glass Constants | |
|---|---|---|---|---|---|
| | | | | $n$ | $v$ |
| 11 | | $t_{11}=$ | 12.88 | $n_{11}=1.69100$ | $v_{11}=54.8$ |
| | $r_{19}=$ −64.55 | $d_{11}=$ | 0.49 | | |
| | $r_{20}=$ −3944.00 | $t_{12}=$ | 14.29 | $n_{12}=1.64000$ | $v_{12}=60.2$ |
| 12 | $r_{21}=$ −122.67 | | | | |

$f = 100.0$
aperture ratio = 1:3.3
viewing angle = 94.5°
$bf = 185.4$
$f_{IA + IB} = -187.0$ 8. An extrawide-angle retrofocus objective having the data shown in the following Table IX in which focal length $f$, back focal length $bf$, combined focal length $f_{IA + IB}$ of lenses 1 and 2, the radii $r$, lens thicknesses $t$, and distances $d$ between the lenses are in mm while $n$ is the refractive index with respect to the $d$-line for the lenses 1–12 and $v$ is the Abbe number for the lenses 1–12:

TABLE IX

| Lens | | | | Glass Constants | |
|---|---|---|---|---|---|
| | | | | $n$ | $v$ |
| 1 | $r_1=$ 173.11 | $t_1=$ | 13.67 | $n_1=1.72000$ | $v_1=50.3$ |
| | $r_2=$ 103.83 | $d_1=$ | 26.76 | | |
| 2 | $r_3=$ 171.25 | $t_2=$ | 9.57 | $n_2=1.71700$ | $v_2=47.9$ |
| | $r_4=$ 109.31 | $d_2=$ | 21.53 | | |
| 3 | $r_5=$ 201.01 | $t_3=$ | 38.18 | $n_3=1.69680$ | $v_3=55.6$ |
| | $r_6=$ −1254.00 | $d_3=$ | 0.98 | | |
| 4 | $r_7=$ 122.85 | $t_4=$ | 5.27 | $n_4=1.72000$ | $v_4=50.3$ |
| | $r_8=$ 55.36 | $d_4=$ | 22.46 | | |
| 5 | $r_9=$ −517.40 | $t_5=$ | 5.62 | $n_5=1.71264$ | $v_5=43.2$ |
| | $r_{10}=$ 99.37 | | | | |
| 6 | $r_{11}=$ −278.85 | $t_6=$ | 40.63 | $n_6=1.68893$ | $v_6=31.2$ |
| 7 | $r_{12}=$ −512.70 | $t_7=$ | 5.62 | $n_7=1.67790$ | $v_7=50.6$ |
| | | $d_7=$ | 0.49 | | |
| 8 | $r_{13}=$ 148.43 | $t_8=$ | 40.99 | $n_8=1.60717$ | $v_8=40.2$ |
| | $r_{14}=$ −102.60 | $d_8=$ | 19.09 | | |
| 9 | $r_{15}=$ −65.70 | $t_9=$ | 7.28 | $n_9=1.74000$ | $v_9=28.2$ |
| 10 | $r_{16}=$ 81.55 | $t_{10}=$ | 12.40 | $n_{10}=1.58144$ | $v_{10}=40.8$ |
| | $r_{17}=$ −715.40 | $d_{10}=$ | 4.74 | | |
| 11 | $r_{18}=$ −142.77 | $t_{11}=$ | 12.89 | $n_{11}=1.69100$ | $v_{11}=54.8$ |
| | $r_{19}=$ −69.62 | $d_{11}=$ | 0.49 | | |
| 12 | $r_{20}=$ −1492.00 | $t_{12}=$ | 14.31 | $n_{12}=1.64000$ | $v_{12}=60.2$ |
| | $r_{21}=$ −106.67 | | | | |

$f = 100.0$
aperture ratio = 1:3.3
viewing angle = 94.5°
$bf = 185.7$
$f_{IA + IB} = -202.6$ 9. An extrawide-angle retrofocus objective having the data shown in the following Table XI in which focal length $f$, back focal length $bf$, combined focal length $f_{IA+IB}$ of lenses 1 and 2, the radii $r$, lens thicknesses $t$, and distances $d$ between the lenses are in mm while $n$ is the refractive index with respect to the $d$-line for the lenses 1–11 and $v$ is the Abbe number for the lenses 1–11:

TABLE XI

| Lens | | | | | Glass Constants $n$ | $v$ |
|---|---|---|---|---|---|---|
| 1 | $r_1=$ | 176.83 | $t_1=$ | 13.65 | $n_1=1.72000$ | $v_1=50.3$ |
|   | $r_2=$ | 102.62 | | | | |
|   | | | $d_1=$ | 26.72 | | |
| 2 | $r_3=$ | 171.91 | $t_2=$ | 9.56 | $n_2=1.71700$ | $v_2=47.9$ |
|   | $r_4=$ | 113.18 | | | | |
|   | | | $d_2=$ | 21.50 | | |
| 3 | $r_5=$ | 214.61 | $t_3=$ | 38.13 | $n_3=1.69680$ | $v_3=55.6$ |
|   | $r_6=$ | −1370.00 | | | | |
|   | | | $d_3=$ | 0.98 | | |
| 4 | $r_7=$ | 118.52 | $t_4=$ | 5.27 | $n_4=1.72000$ | $v_4=50.3$ |
|   | $r_8=$ | 55.05 | | | | |
|   | | | $d_4=$ | 22.43 | | |
| 5 | $r_9=$ | 1499.00 | $t_5=$ | 5.61 | $n_5=1.69680$ | $v_5=55.6$ |
|   | $r_{10}=$ | 149.72 | | | | |
|   | | | $d_5=$ | 4.39 | | |
| 6 | $r_{11}=$ | 160.19 | $t_6=$ | 38.86 | $n_6=1.68893$ | $v_6=31.2$ |
|   | $r_{12}=$ | −570.70 | | | | |
|   | | | $d_6=$ | 0.49 | | |
| 7 | $r_{13}=$ | 178.68 | $t_7=$ | 40.97 | $n_7=1.60717$ | $v_7=40.2$ |
|   | $r_{14}=$ | −99.96 | | | | |
|   | | | $d_7=$ | 19.06 | | |
| 8 | $r_{15}=$ | −66.77 | $t_8=$ | 7.26 | $n_8=1.74000$ | $v_8=28.2$ |
|   | $r_{16}=$ | 81.43 | | | | |
| 9 | | | $t_9=$ | 12.38 | $n_9=1.58144$ | $v_9=40.8$ |
|   | $r_{17}=$ | −850.00 | | | | |
|   | | | $d_9=$ | 4.73 | | |
| 10 | $r_{18}=$ | −152.37 | $t_{10}=$ | 12.87 | $n_{10}=1.69100$ | $v_{10}=54.8$ |
|    | $r_{19}=$ | −69.18 | | | | |
|    | | | $d_{10}=$ | 0.49 | | |
| 11 | $r_{20}=$ | −937.80 | $t_{11}=$ | 14.29 | $n_{11}=1.64000$ | $v_{11}=60.2$ |
|    | $r_{21}=$ | −108.71 | | | | |

$f = 100.0$
aperture ratio = 1:3.3
viewing angle = 94.5°
$bf = 185.4$
$f_{IA+IB} = -203.6$

* * * * *